(12) United States Patent
Hashimoto et al.

(10) Patent No.: US 12,033,397 B2
(45) Date of Patent: Jul. 9, 2024

(54) CONTROLLER, METHOD, AND COMPUTER PROGRAM FOR CONTROLLING VEHICLE

(71) Applicant: TOYOTA JIDOSHA KABUSHIKI KAISHA, Toyota (JP)

(72) Inventors: Daisuke Hashimoto, Chofu (JP); Norimasa Kobori, Tokyo-to (JP); Hitoshi Kamada, Kawasaki (JP); Yushi Nagata, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 17/655,133

(22) Filed: Mar. 16, 2022

(65) Prior Publication Data

US 2022/0301320 A1 Sep. 22, 2022

(30) Foreign Application Priority Data

Mar. 16, 2021 (JP) .................................. 2021-042214

(51) Int. Cl.
*G06V 20/58* (2022.01)
*B60W 30/095* (2012.01)
(Continued)

(52) U.S. Cl.
CPC ....... *G06V 20/584* (2022.01); *B60W 30/0956* (2013.01); *B60W 40/04* (2013.01);
(Continued)

(58) Field of Classification Search
CPC .... G06V 20/584; G06V 10/25; G06V 10/765; G06V 10/82; G06V 2201/07;
(Continued)

(56) References Cited

U.S. PATENT DOCUMENTS 5,091,726 A * 2/1992 Shyu ...................... B60Q 1/535
701/96
8,547,249 B2 * 10/2013 David .................... G08G 1/166
340/936

(Continued)

FOREIGN PATENT DOCUMENTS

| JP | 2020042786 A | 3/2020 |
| JP | 2020052539 A | 4/2020 |
| JP | 2020123333 A | 8/2020 |

*Primary Examiner* — Negussie Worku
(74) *Attorney, Agent, or Firm* — Dickinson Wright, PLLC (57) ABSTRACT

A vehicle controller includes a processor configured to: input characteristics extracted from an object region representing a target vehicle in an image obtained by a camera of a vehicle into a light-state classifier to identify a light state that is the state of a signal light of the target vehicle; determine a first control value, based on the result of identification of the light state and the positional relationship between the vehicle and the target vehicle, in accordance with a predetermined rule; input the result of identification of the light state into a control command classifier, which has been trained to output a second control value for controlling the vehicle to avoid a collision between the vehicle and the target vehicle, thereby determining the second control value; and determine an integrated control value to be used for controlling the vehicle, based on the first and second control values.

10 Claims, 5 Drawing Sheets

(51) Int. Cl.
  *B60W 40/04* (2006.01)
  *B60W 60/00* (2020.01)
  *G06V 10/25* (2022.01)
  *G06V 10/764* (2022.01)
  *G06V 10/82* (2022.01)

(52) U.S. Cl.
  CPC ......... *B60W 60/0015* (2020.02); *G06V 10/25* (2022.01); *G06V 10/765* (2022.01); *G06V 10/82* (2022.01); *B60W 2420/403* (2013.01); *B60W 2554/4041* (2020.02); *B60W 2554/80* (2020.02); *G06V 2201/07* (2022.01)

(58) Field of Classification Search
  CPC .. G06V 20/58; B60W 30/0956; B60W 40/04; B60W 60/0015; B60W 2420/403; B60W 2554/4041; B60W 2554/80; B60W 2554/404; B60W 2554/801; B60W 2554/802; B60W 2554/803; B60W 2554/804; B60W 30/095; B60W 40/00; B60W 40/02; G06N 3/0464; G06N 3/09; G06N 3/0442; G06N 3/084; G06N 20/10

USPC ........................................................ 358/104
  See application file for complete search history.

(56) References Cited

U.S. PATENT DOCUMENTS

| | | | |
|---|---|---|---|
| 9,827,675 B2* | 11/2017 | Moridaira | B25J 9/1623 |
| 10,007,269 B1* | 6/2018 | Gray | B60W 30/09 |
| 11,900,690 B2* | 2/2024 | Hashimoto | B60Q 1/085 |
| 2018/0373250 A1* | 12/2018 | Nakamura | G05D 1/0257 |
| 2019/0339707 A1* | 11/2019 | Chen | G06N 3/047 |
| 2020/0097741 A1 | 3/2020 | Takeyasu et al. | |
| 2020/0242477 A1 | 7/2020 | Kim et al. | |
| 2021/0197775 A1* | 7/2021 | Brandin | B60W 10/184 |
| 2021/0309214 A1* | 10/2021 | Hashimoto | B60W 30/08 |
| 2022/0055618 A1* | 2/2022 | Toyoda | B60W 40/04 |
| 2023/0177844 A1* | 6/2023 | Kobori | G06V 10/7715 |
| | | | 382/103 |

\* cited by examiner

CONTROLLER, METHOD, AND COMPUTER PROGRAM FOR CONTROLLING VEHICLE

FIELD

The present invention relates to a controller, a method, and a computer program for controlling a vehicle.

BACKGROUND

It is desirable that the motion of vehicles around a host vehicle can be correctly predicted to control the vehicle for autonomous driving or assist a driver in driving the vehicle. To predict the motion of a vehicle, a technique in which a machine learning technique, such as a "deep neural network" (hereafter simply a "DNN"), is used has been proposed (see Japanese Unexamined Patent Publication No. 2020-42786).

A method for processing an automobile image disclosed in Japanese Unexamined Patent Publication No. 2020-42786 includes obtaining a to-be-processed image collected by an automobile-image collecting point provided on an autonomous-driving device, processing the image with a deep learning model, outputting a state parameter of an automobile in the image, and determining the motion of the automobile in the image according to the state parameter. The state parameter of the automobile in the image is used to indicate the state of one or more of the following: a brake light, a turn signal, a car door, a trunk door, and a wheel orientation.

SUMMARY

Depending on the travel situation around a host vehicle, it may be difficult to accurately detect the state of a direction indicator or a brake light of a vehicle traveling in an area around a host vehicle. Failure of a vehicle controller in detecting the state of a direction indicator or a brake light may lead to inappropriate vehicle control. For example, the host vehicle may approach a vehicle so much as to cause a risk of collision with the vehicle, or may unnecessarily decelerate or brake.

It is an object of the present invention to provide a vehicle controller that can appropriately control a host vehicle even if it is difficult to identify the state of a signal light of a vehicle in an area around the host vehicle.

According to an embodiment, a vehicle controller is provided. The vehicle controller includes a processor configured to: detect an object region from an image obtained by a camera mounted on a vehicle, the camera being configured to capture surroundings of the vehicle, and the object region representing a target vehicle traveling in an area around the vehicle; input characteristics extracted from the object region in the image into a light-state classifier to identify a light state that is the state of a signal light of the target vehicle, the light-state classifier having been trained to identify the light state of the target vehicle; determine a first control value, based on the result of identification of the light state of the target vehicle and the positional relationship between the vehicle and the target vehicle, in accordance with a predetermined rule for controlling the vehicle to avoid a collision between the vehicle and the target vehicle; input the result of identification of the light state of the target vehicle into a control command classifier to determine a second control value for controlling the vehicle to avoid a collision between the vehicle and the target vehicle, the control command classifier having been trained to output the second control value; determine an integrated control value for avoiding a collision between the vehicle and the target vehicle, based on the difference between the first and second control values or the absolute value of the second control value; and control travel of the vehicle according to the integrated control value.

The processor of the vehicle controller preferably outputs the first and second control values, respectively, every predetermined time interval; and in the case that the absolute value of the difference between the first and second control values has not been greater than a certain value over a period not shorter than a predetermined time threshold, the processor preferably determines an average of any one of first control values and any one of second control values outputted in the period as the integrated control value.

Alternatively, the processor preferably output the first and second control values, respectively, every predetermined time interval; and in the case that the absolute value of the difference between the first and second control values has not been less than a certain value over a period not shorter than a predetermined time threshold, the processor preferably determines the greater of the absolute value of an average of first control values outputted in the period and the absolute value of an average of second control values outputted in the period as the integrated control value.

When the absolute value of the second control value is not less than a predetermined upper limit, the processor of the vehicle controller preferably determines the upper limit or the first control value as the integrated control value.

The processor of the vehicle controller preferably determines the second control value by inputting, into the control command classifier, the result of identification of the light state of the target vehicle and at least one of the following: the positional relationship between the vehicle and the target vehicle, a relative speed between the vehicle and the target vehicle, relative acceleration/deceleration between the vehicle and the target vehicle, the size of the object region, and the position of the object region.

Additionally, the light-state classifier preferably includes an input layer into which characteristics extracted from the object region are inputted, an output layer that outputs the light state of the target vehicle, and at least one intermediate layer between the input layer and the output layer, the at least one intermediate layer being provided sequentially from the input layer toward the output layer and each executing a predetermined operation on output from a layer closer to the input layer than the intermediate layer. The processor of the vehicle controller preferably determines the second control value by inputting the result of identification of the light state of the target vehicle and the result of the predetermined operation by any one of the at least one intermediate layer of the light-state classifier into the control command classifier.

Additionally, the light-state classifier preferably has a recursive structure; and the processor of the vehicle controller preferably identifies the light state of the target vehicle by inputting the characteristics extracted from the object region in the image and characteristics extracted from the object region in each of one or more past images obtained by the camera earlier than the image into the light-state classifier in chronological order.

Alternatively, the light-state classifier is preferably a convolutional neural network including a convolution layer that executes a convolution operation in a temporal direction; and the processor of the vehicle controller preferably identifies the light state of the target vehicle by inputting the characteristics extracted from the object region in the image and characteristics extracted from the object region in each of one or more past images obtained by the camera earlier than the image into the light-state classifier.

According to another embodiment, a method for controlling a vehicle is provided. The method includes detecting an object region representing a target vehicle traveling in an area around the vehicle from an image obtained by a camera mounted on the vehicle. The camera is configured to capture surroundings of the vehicle. The method further includes inputting characteristics extracted from the object region in the image into a light-state classifier to identify a light state that is the state of a signal light of the target vehicle; determining a first control value, based on the result of identification of the light state of the target vehicle and the positional relationship between the vehicle and the target vehicle, in accordance with a predetermined rule for controlling the vehicle to avoid a collision between the vehicle and the target vehicle; and inputting the result of identification of the light state of the target vehicle into a control command classifier to determine a second control value for controlling the vehicle to avoid a collision between the vehicle and the target vehicle. The light-state classifier has been trained to identify the light state of the target vehicle, and the control command classifier has been trained to output the second control value. The method further includes determining an integrated control value for avoiding a collision between the vehicle and the target vehicle, based on the difference between the first and second control values or the absolute value of the second control value; and controlling travel of the vehicle according to the integrated control value.

According to still another embodiment, a non-transitory recording medium that stores a computer program for controlling a vehicle is provided. The computer program includes instructions causing a processor mounted on the vehicle to execute a process including detecting an object region representing a target vehicle traveling in an area around the vehicle from an image obtained by a camera mounted on the vehicle. The camera is configured to capture surroundings of the vehicle. The process further includes inputting characteristics extracted from the object region in the image into a light-state classifier to identify a light state that is the state of a signal light of the target vehicle; determining a first control value, based on the result of identification of the light state of the target vehicle and the positional relationship between the vehicle and the target vehicle, in accordance with a predetermined rule for controlling the vehicle to avoid a collision between the vehicle and the target vehicle; and inputting the result of identification of the light state of the target vehicle into a control command classifier to determine a second control value for controlling the vehicle to avoid a collision between the vehicle and the target vehicle. The light-state classifier has been trained to identify the light state of the target vehicle, and the control command classifier has been trained to output the second control value. The process further includes determining an integrated control value for avoiding a collision between the vehicle and the target vehicle, based on the difference between the first and second control values or the absolute value of the second control value; and controlling travel of the vehicle according to the integrated control value.

The vehicle controller according to the present invention has an advantageous effect of being able to appropriately control a host vehicle even if it is difficult to identify the state of a signal light of a vehicle in an area around the host vehicle.

DESCRIPTION OF EMBODIMENTS

A vehicle controller, a method for controlling a vehicle executed by the vehicle controller, and a computer program for controlling a vehicle will now be described with reference to the attached drawings. The vehicle controller identifies the state of a signal light of a vehicle traveling in an area around a host vehicle and represented in time-series images generated by a camera mounted on the host vehicle (hereafter referred to as a "target vehicle" for convenience of description), and controls the host vehicle, using the result of identification. To achieve this, the vehicle controller inputs the time-series images into a classifier for object detection that has been trained to detect a target vehicle, thereby detecting a region including a target vehicle (hereafter, an "object region") in each image. The vehicle controller then tracks the target vehicle detected from each image to associate the object regions representing the same target vehicle in the respective images with each other. Additionally, the vehicle controller inputs characteristics obtained from pixel values of the object regions representing the same target vehicle in the time-series images in chronological order into a classifier for identifying the state of a signal light (hereafter simply the "light state"), thereby identifying the light state of the target vehicle. The vehicle controller then determines a first control command including a first control value, based on the result of identification of the light state of the target vehicle and the positional relationship between the host vehicle and the target vehicle, in accordance with a predetermined rule for controlling the host vehicle to avoid a collision between the host vehicle and the target vehicle. Additionally, the vehicle controller inputs the result of identification of the light state of the target vehicle into a classifier for determining a control command that has been trained to output a control value for controlling the host vehicle to avoid a collision between the host vehicle and the target vehicle, thereby determining a second control command including a second control value. The vehicle controller then determines an integrated control command including a final control value (hereafter, an "integrated control value"), based on the first and second control values, and controls travel of the host vehicle according to the integrated control command.

For example, a target vehicle blinks a turn signal at a lane change, and turns on the brake lights at deceleration. Turning-on or blinking of a signal light, including such a signal or a light, probably indicates the motion that a target vehicle is making or will make immediately. Thus the vehicle controller identifies the light state of a target vehicle, and determines an integrated control command, based on a control command obtained by the classifier for determining a control command, into which the result of identification is inputted, and on a control command determined in accordance with a predetermined rule, based on, for example, the result of identification. In this way, the vehicle controller evaluates the control commands obtained in accordance with two techniques in which the result of identification of the light state is used, thereby determining an integrated control command with which the host vehicle can probably avoid a collision with the target vehicle. For this reason, the vehicle controller can determine an appropriate control command even in a travel situation in which it is difficult to identify the light state of the target vehicle. In the following example, the acceleration or deceleration (hereafter "acceleration/deceleration") of the host vehicle is determined as a control value included in each control command. However, each control value is not limited to acceleration/deceleration, and may be a steering angle.

Figure 1:
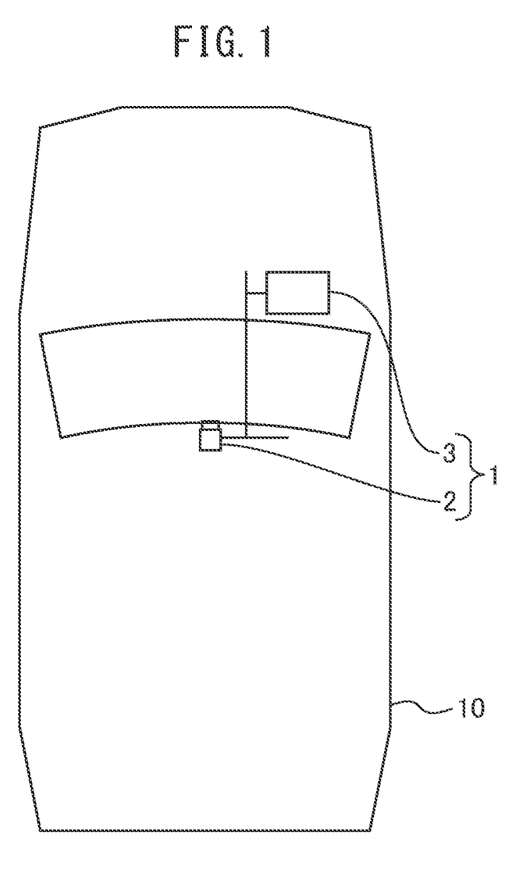
FIG. 1 schematically illustrates the configuration of a vehicle control system equipped with a vehicle controller.
Figure 2:
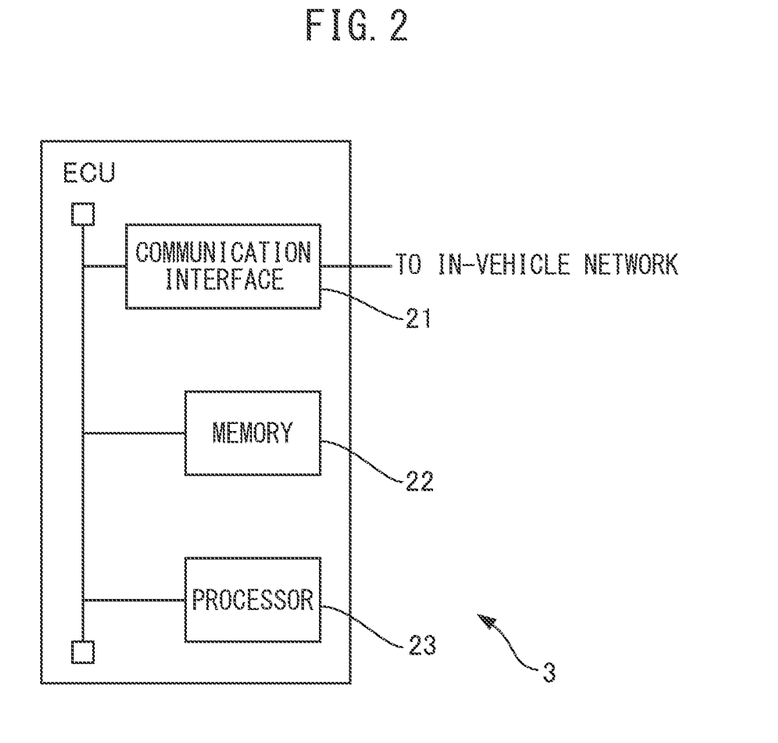
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a host vehicle 10 and controls the vehicle 10, includes a camera 2 for capturing the surroundings of the vehicle 10, and an electronic control unit (ECU) 3, which is an example of the vehicle controller. The camera 2 is connected to the ECU 3 via an in-vehicle network conforming to a standard, such as a controller area network, so that they can communicate with each other. The vehicle control system 1 may further include a storage device that contains a map used for autonomous driving control of the vehicle 10. The vehicle control system 1 may further include a range sensor, such as LiDAR or radar; a GPS receiver or another receiver for determining the position of the vehicle 10 in conformity with a satellite positioning system; a wireless terminal for wireless communication with another device; and a navigation device for searching for a planned travel route of the vehicle 10.

The camera 2, which is an example of the image capturing unit, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 captures a region in front of the vehicle 10 every predetermined capturing period (e.g., 1/30 to 1/10 seconds), and generates images representing this region. The images obtained by the camera 2 are preferably color images. The vehicle 10 may include multiple cameras taking pictures in different orientations or having different focal lengths.

Whenever generating an image, the camera 2 outputs the generated image to the ECU 3 via the in-vehicle network.

The ECU 3 controls the vehicle 10. In the present embodiment, the ECU 3 controls the vehicle 10 for autonomous driving, based on the light state of a target vehicle detected from time-series images obtained by the camera 2, to avoid a collision between the vehicle 10 and the target vehicle. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Whenever receiving an image from the camera 2, the communication interface 21 passes the received image to the processor 23.

The memory 22, which is an example of a storage unit, includes, for example, volatile and nonvolatile semiconductor memories. In the case that the processor 23 includes multiple operating units as will be described below, the memory 22 may include dedicated memory circuits for the respective operating units. The memory 22 contains various types of data and various parameters used in a vehicle control process executed by the processor 23 of the ECU 3, e.g., images received from the camera 2 and various parameters for specifying classifiers used in the vehicle control process. The memory 22 also contains various types of data generated in the vehicle control process, such as a detected-object list indicating information on detected target vehicles, for a certain period. The memory 22 may further contain information used for travel control of the vehicle 10, such as map information.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit (GPU). Whenever receiving an image from the camera 2 during travel of the vehicle 10, the processor 23 detects a target vehicle from the received image and controls the vehicle 10 for autonomous driving so that the vehicle 10 will not collide with the target vehicle.

Figure 3:
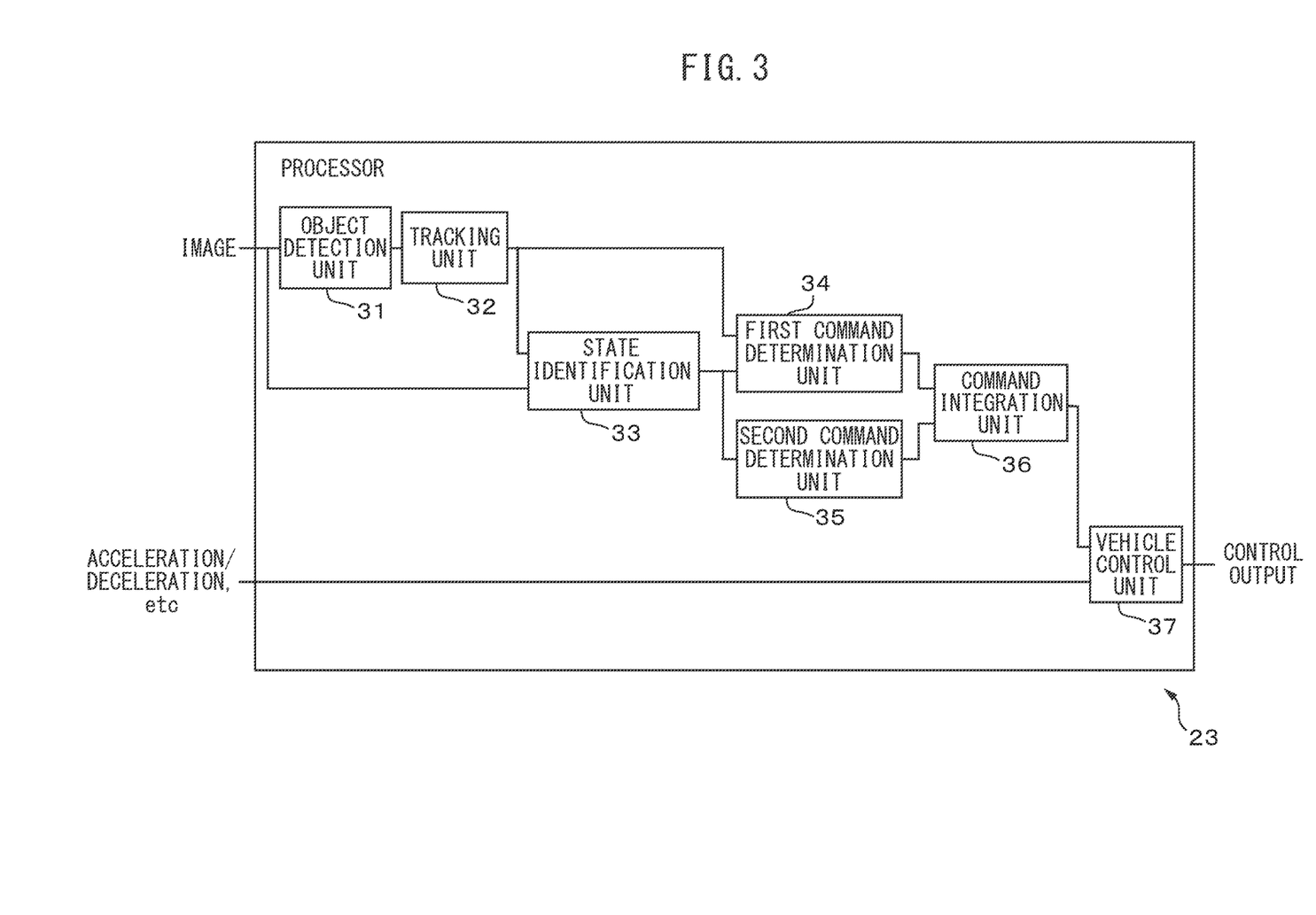
FIG. 3 is a functional block diagram of a processor of the electronic control unit, related to a vehicle control process.

FIG. 3 is a functional block diagram of the processor 23 of the ECU 3, related to the vehicle control process. The processor 23 includes an object detection unit 31, a tracking unit 32, a state identification unit 33, a first command determination unit 34, a second command determination unit 35, a command integration unit 36, and a vehicle control unit 37. These units included in the processor 23 are, for example, functional modules implemented by a computer program executed on the processor 23, or may be dedicated operating circuits provided on the processor 23. In the case that the vehicle 10 includes multiple cameras, the processor 23 may execute the vehicle control process for each camera, based on images obtained by the camera.

Whenever receiving an image from the camera 2, the object detection unit 31 inputs the latest received image into a classifier for object detection, and thereby detects a region of a predetermined shape including a target vehicle represented in the image (i.e., an object region) and identifies the type of the target vehicle.

In the present embodiment, the object detection unit 31 uses, as the classifier for object detection, a DNN that has been trained to detect an object region including a target vehicle represented in an image and to identify the type of the target vehicle. The DNN used by the object detection unit 31 may be, for example, a DNN having a convolutional neural network (hereafter, "CNN") architecture, such as Single Shot MultiBox Detector (SSD) or Faster R-CNN.

For example, in the case that the classifier for object detection is configured as a DNN, the classifier includes a main part provided on the input of images as well as a position detection part and a type estimation part that are provided closer to the output than the main part. The position detection part outputs a circumscribed rectangle of a detection target, such as a target vehicle, represented in an image as an object region, based on output from the main part. The shape of the object region is not limited to a rectangle, and may be, for example, a circle, an ellipse, or a polygon having five or more sides. The type estimation part calculates confidence scores of respective types (e.g., ordinary passenger car, bus, truck, and motorcycle) for the target vehicle represented in an object region detected by the position detection part, based on output from the main part. The position detection part and the type estimation part may be integrated.

The main part may be, for example, a CNN including multiple layers connected in series from the input toward the output. These layers include two or more convolution layers. The multiple layers of the main part may further include a pooling layer every one or more convolution layers.

Upon input of an image, the main part executes an operation on the image in each layer to output a feature map calculated from the image. The main part may output multiple feature maps of different resolutions. For example, the main part may output a feature map with the same resolution as the inputted image, and one or more feature maps with a resolution lower than the inputted image.

The feature maps outputted from the main part are inputted into the position detection part and the type estimation part. The position detection part and the type estimation part may be, for example, CNNs each including multiple layers connected in series from the input toward the output. In the position detection part and the type estimation part, the multiple layers of each CNN include two or more convolution layers, and may further include a pooling layer every one or more convolution layers. The convolution layers and the pooling layers may be common to the CNNs of the position detection part and the type estimation part. In the position detection part and the type estimation part, the multiple layers may further include one or more fully-connected layers. In this case, the fully-connected layers are preferably provided closer to the output than the convolution layers. The output from the convolution layers may be directly inputted into the fully-connected layers. The output layer of the type estimation part may be a softmax layer that calculates confidence scores of respective types of target vehicles in accordance with a softmax function, or a sigmoid layer that calculates such confidence scores in accordance with a sigmoid function.

The position detection part and the type estimation part are trained to output confidence scores of respective types of target vehicles, for example, for each of regions located at various positions in an image and having various sizes and aspect ratios. Thus, upon input of an image, the classifier outputs confidence scores of respective types of target vehicles for each of regions located at various positions in the image and having various sizes and aspect ratios. The position detection part and the type estimation part then detect a region for which the confidence score of a certain type of target vehicle is not less than a predetermined confidence-score threshold, as an object region representing a target vehicle of this type.

Images included in training data (training images) used for training the classifier are tagged with, for example, types of target vehicles to be detected and circumscribed rectangles of the target vehicles, which are object regions representing the target vehicles.

The classifier is trained with a large number of training images like those described above in accordance with a training technique, such as backpropagation. The processor 23 can accurately detect a target vehicle to be detected, from an image, using the classifier trained in this way.

According to a modified example, the object detection unit 31 may use a classifier other than a DNN to detect a target vehicle from an image. As the classifier for object detection, the object detection unit 31 may use, for example, a support vector machine (SVM) that has been trained to output a confidence score indicating how likely a target vehicle is represented in a window defined on an image in response to input of a feature calculated with respect to the window. While variously changing the position, size, and aspect ratio of the window defined on an image, the object detection unit 31 calculates a feature (e.g., HOG) with respect to the window and inputs the calculated feature into the SVM to determine the confidence score for the window. The object detection unit 31 may determine that a target vehicle is represented in a window for which the confidence score is not less than a predetermined confidence-score threshold, and determine this window as an object region.

The object detection unit 31 may also detect an object that affects travel control of the vehicle 10, besides target vehicles. Examples of such an object include a human, a signpost, a traffic light, a road marking such as a lane-dividing line, and another object on a road. In this case, the classifier for object detection is trained in advance to detect these objects. The object detection unit 31 can also detect these objects by inputting an image into the classifier for object detection.

The object detection unit 31 may further execute a non-maximum suppression (NMS) process to select one of two or more overlapping object regions that are assumed to represent the same object.

The object detection unit 31 enters, in a detected-object list, the positions and areas of object regions in the image as well as the types of the objects included in the respective object regions. The object detection unit 31 stores the detected-object list in the memory 22. For each object region, the object detection unit 31 also stores, in the memory 22, a feature map calculated by the main part of the classifier for object detection from the pixels in the object region and outputted to the state identifying unit 33. Feature maps outputted to the state identifying unit 33 may be ones with the same resolution as an image inputted into the classifier for object detection. In the case that, for example, the pooling layers included in the main part of the classifier for object detection calculate a feature map with a resolution lower than an inputted image, this low-resolution feature map may be outputted to the state identifying unit 33. Feature maps of different resolutions calculated by the main part of the classifier for object detection may be outputted to the state identifying unit 33.

For each object region detected from the latest image, the tracking unit 32 refers to the detected-object list to associate the target vehicle represented in the object region with a target vehicle detected from a past image, thereby tracking the target vehicle represented in the object region.

The tracking unit 32 applies, for example, a tracking process based on optical flow, such as the Lucas-Kanade method, to an object region of interest in the latest image and object regions in past images, thereby tracking the target vehicle represented in the object regions. To this end, the tracking unit 32 applies, for example, a filter for extracting characteristic points, such as SIFT or Harris operator, to the object region of interest, thereby extracting characteristic points from this object region. The tracking unit 32 then identifies those points in the object regions in the past images which correspond to each of the characteristic points in accordance with the applied tracking technique, thereby calculating the optical flow. Alternatively, the tracking unit 32 may apply another tracking technique applied for tracking a moving object detected from an image to the object region of interest in the latest image and the object regions in the past images, thereby tracking the target vehicle represented in the object regions.

The tracking unit 32 determines a target vehicle detected from the latest image and associated with none of the target vehicles represented in the past images as a new tracking target, assigns this target vehicle an identification number different from the identification numbers of the other tracked target vehicles, and enters the assigned identification number in the detected-object list. In contrast, the tracking unit 32 associates a target vehicle detected from the latest image and associated with a target vehicle represented in the past images, i.e., one of the tracked target vehicles, with the same identification number as assigned to this tracked target vehicle.

The tracking unit 32 notifies the state identification unit 33 of the identification numbers of the tracked target vehicles, which are targets for state identification. The tracking unit 32 further estimates the positional relationship between each tracked target vehicle, which is a target for state identification, and the vehicle 10 as well as the relative speed and the deceleration of the target vehicle, and enters the result of estimation in the detected-object list.

The tracking unit 32 can identify the direction from the vehicle 10 to a target vehicle, based on the position of the object region including the target vehicle in the image and the direction of the optical axis of the camera 2. The bottom position of an object region is supposed to correspond to the position at which the target vehicle represented in this object region is in contact with the road surface. Thus the tracking unit 32 can estimate the distance to the target vehicle represented in an object region, based on the direction from the camera 2 corresponding to the bottom of the object region and the height of the mounted position of the camera 2. When the distance between the vehicle 10 and a target vehicle in a direction perpendicular to the travel direction of the vehicle 10 (hereafter, a "lateral direction") is shorter than the distance corresponding to the width of a lane, the tracking unit 32 assumes that the vehicle 10 and the target vehicle are traveling on the same lane. In contrast, when the distance between the vehicle 10 and a target vehicle in the lateral direction is the distance corresponding to the width of a lane, the tracking unit 32 assumes that the target vehicle is traveling on a lane adjoining the travel lane of the vehicle 10. Additionally, the tracking unit 32 estimates the speed of a target vehicle relative to the vehicle 10 and the deceleration of the target vehicle, based on the changes in distance and direction from the vehicle 10 to the target vehicle as well as the speed and the acceleration/deceleration of the vehicle 10 at the time of generation of each image. The changes in distance and direction from the vehicle 10 to the target vehicle are estimated from the change in position of the object regions in respective images generated while the target vehicle is tracked.

For each tracked target vehicle, the state identification unit 33 inputs characteristics obtained from pixel values of the object region including the target vehicle into a classifier which identifies the light state (hereafter simply a "light-state classifier") and has a recursive structure whenever an image is obtained from the camera 2. More specifically, characteristics obtained from the object regions of the target vehicle in the latest image obtained by the camera 2 and in one or more past images obtained by the camera 2 earlier than the latest image are inputted into the light-state classifier in chronological order. The state identification unit 33 uses the result of output from the classifier to identify the light state of the target vehicle involving time-varying changes in outward appearance.

As the characteristics obtained from pixel values of an object region representing a target vehicle, the state identifying unit 33 may use, for example, features included in the object region of a feature map calculated by the main part of the classifier for object detection. This enables using not only the characteristics of a target vehicle itself but also those of the surroundings of the target vehicle for state identification. In the present embodiment, the light-state classifier can identify the light state of a target vehicle, taking account of the effect of the positional relationship between the target vehicle and a vehicle traveling ahead of or behind the target vehicle, e.g., the situation in which a turn signal of the target vehicle is partially covered by another vehicle. For example, when the resolution of the feature map is the same as that of an image inputted into the classifier for object detection, the features included in the region in the feature map corresponding to the object region in the inputted image are the characteristics obtained from pixel values of the object region. When the resolution of the feature map is lower than that of an image inputted into the classifier for object detection, the position and area obtained by modifying the coordinates of the object region as a function of the ratio of the resolution of the feature map to that of the inputted image define the region in the feature map corresponding to the object region. For example, assume that the upper left and lower right ends of the object region in the inputted image are (tlX, tlY) and (brX, brY), respectively, and that the feature map is calculated by scale-down of the inputted image to 1/N (N is an integer not less than two). In this case, the upper left and lower right ends of the region in the feature map corresponding to the object region in the inputted image are (tlX/N, tlY/N) and (brX/N, brY/N), respectively.

According to a modified example, the state identifying unit 33 may use pixel values of an object region representing a target vehicle in an image inputted into the classifier for object detection as the characteristics obtained from pixel values of the object region representing the target vehicle to be inputted into the light-state classifier. Alternatively, the state identifying unit 33 may use values obtained by executing a predetermined filtering process, such as a convolution operation, on the pixels of the object region as the characteristics obtained from pixel values of the object region representing the target vehicle to be inputted into the light-state classifier.

The state identifying unit 33 executes downsampling or upsampling on the extracted characteristics of each object region to resize them to a predetermined size (e.g., 32 by 32). Thus, even if the relative distance between the vehicle 10 and the target vehicle changes during tracking thereof to result in a change in size of the target vehicle in an image, the light-state classifier can use the inputted characteristics as constant-size ones, which simplifies the configuration of the light-state classifier.

As the light-state classifier having a recursive structure, the state identifying unit 33 can use, for example, a neural network having a recursive structure, such as a recurrent neural network (RNN), a long short-term memory (LSTM), or a gated recurrent unit (GRU). Such a neural network includes an input layer into which characteristics obtained from pixel values of an object region are inputted, an output layer that outputs the result of identification of the light state, and at least one intermediate layer provided between the input layer and the output layer sequentially from the input layer toward the output layer. Some of the at least one intermediate layer is configured to have the recursive structure. Additionally, the at least one intermediate layer may include a layer that executes a predetermined operation, such as a convolution operation, on output from an upstream layer. The light-state classifier, which merely has to process characteristics included in an object region, includes smaller input and intermediate layers and are defined by fewer parameters, including weighting factors, than the classifier for object detection. For this reason, the amount of computation of the light-state classifier is less than that of the classifier for object detection, reducing the computational burden on the processor 23. Additionally, the amount of computation required to train the light-state classifier is also reduced.

The light-state classifier, which has a recursive structure, updates its internal state whenever characteristics are inputted in chronological order. In this way, the light-state classifier can identify the state of lighting of a signal light of a tracked target vehicle, based on time-varying changes in the signal light. In the present embodiment, the state identifying unit 33 identifies whether the right or left turn signal or the hazard lights are blinking and whether the brake lights are on or off, as the light state of a target vehicle. To this end, for example, a sigmoid function is used as the activation function of the output layer of the light-state classifier. This enables the light-state classifier to output confidence scores of the respective states. The state identifying unit 33 then compares the confidence score of each state with a corresponding threshold, and determines that the signal lights of the target vehicle are in the state of which the confidence score is not less than the corresponding threshold. For example, assume that the confidence score of the state in which the left turn signal of a target vehicle of interest is blinking is 0.8, and that the confidence score of the state in which it is not blinking is 0.2. Additionally, assume that the threshold is 0.5; then, the state identifying unit 33 determines that the light state of the target vehicle of interest is that its left turn signal is blinking.

Alternatively, a softmax function may be used as the activation function of the output layer of the light-state classifier. In this case, the light-state classifier outputs, as the light state of a target vehicle, one of the following results of determination: the left turn signal is blinking; the right turn signal is blinking; the hazard lights are blinking; the brake lights are on; and none of the above. Thus the state identifying unit 33 may identify the light state of the target vehicle as the state indicated by the result of determination outputted from the light-state classifier.

According to a modified example, the state identifying unit 33 may use a neural network that has a CNN architecture and that executes a convolution operation in the temporal direction, as the light-state classifier. In this case, the light-state classifier includes, for example, one or more convolution layers that execute a convolution operation on a feature map outputted from the immediately preceding layer along the temporal direction (hereafter, "temporal-feature convolution layers"). The size of a kernel of the temporal-feature convolution layers related to the temporal direction is determined, for example, so that the convolution operation may be executed all over the period including characteristics inputted all at once by going through all of the temporal-feature convolution layers. The temporal-feature convolution layers may execute, for example, a convolution operation in both the temporal direction and the spatial directions (hereafter, a "three-dimensional convolution operation"), or a convolution operation only in the temporal direction (hereafter, a "time-dimensional convolution operation"). The temporal-feature convolution layers may further execute a convolution operation or a fully-connected operation in the channel direction. In the case that the light-state classifier includes multiple temporal-feature convolution layers, some of them may execute a three-dimensional convolution operation whereas the others may execute a time-dimensional convolution operation. The light-state classifier may further include one or more convolution layers that execute a convolution operation not in the temporal direction but in the spatial directions (hereafter, "spatial-feature convolution layers"). The spatial-feature convolution layers may also execute a convolution operation or a fully-connected operation in the channel direction. In the case that the light-state classifier includes one or more spatial-feature convolution layers, the spatial-feature and the temporal-feature convolution layers may be disposed in any order. For example, the spatial-feature and the temporal-feature convolution layers may be provided in this order from the input toward the output, or in the opposite order. The spatial-feature convolution layers may alternate with the temporal-feature convolution layers. The light-state classifier may further include one or more pooling layers. The light-state classifier may further include one or more activation layers and one or more fully-connected layers. For example, a sigmoid function or a softmax function is used as the activation function of the output layer of the light-state classifier.

For each target vehicle for state identification, the state identification unit 33 enters the result of identification of the light state or the confidence scores of the states thereof in the detected-object list, and notifies them to the first command determination unit 34 and the second command determination unit 35.

The first command determination unit 34 determines a first control command including a first control value, based on the result of identification of the light state of a target vehicle and the positional relationship between the vehicle 10 and the target vehicle, in accordance with a predetermined rule for controlling the vehicle 10 to avoid a collision between and the vehicle the target vehicle. In other words, the first command determination unit 34 executes a "rule-based" process to determine a first control value. In the present embodiment, the first control value is target acceleration/deceleration of the vehicle 10 to avoid a collision between the vehicle 10 and the target vehicle.

For example, the predetermined rule may be that the result of identification of the light state of the target vehicle indicates an on-state of its brake lights for a period P not shorter than a time threshold T1, and that the target vehicle and the vehicle 10 are traveling on the same lane. Additionally, the predetermined rule may be set as follows: the light state of the target vehicle is that its right turn signal is blinking for a period P not shorter than the time threshold T1; and the target vehicle is traveling on the immediate left lane of the travel lane of the vehicle 10 (hereafter, the "host vehicle lane"). Additionally, the predetermined rule may be set as follows: the light state of the target vehicle is that its left turn signal is blinking for a period P not shorter than the time threshold T1; and the target vehicle is traveling on the immediate right lane of the host vehicle lane. When a target vehicle satisfies one of these control conditions, the first command determination unit 34 determines that the vehicle 10 needs to decelerate. In contrast, when no target vehicle satisfies these control conditions, the first command determination unit 34 determines that the vehicle 10 need not decelerate.

When it is determined that the vehicle 10 needs to decelerate, the first command determination unit 34 determines deceleration to decelerate the vehicle 10 as the first control value. Specifically, the first command determination unit 34 determines the deceleration of the vehicle 10, depending on at least one of the following: the distance between the vehicle 10 and the target vehicle that has caused the determination, the speed of the target vehicle relative to the vehicle 10, and the deceleration of the target vehicle. For example, the first command determination unit 34 increases the deceleration of the vehicle 10, as the distance between the vehicle 10 and the target vehicle decreases, as the difference in speed obtained by subtracting the speed of the target vehicle from that of the vehicle 10 increases, or as the deceleration of the target vehicle increases. The first command determination unit 34 then outputs a first control command including the determined deceleration as the first control value to the command integration unit 36.

When it is determined that the vehicle need not decelerate, the first command determination unit 34 outputs a first control command for instructing the vehicle 10 to maintain the current speed (i.e., acceleration/deceleration is 0) to the command integration unit 36.

Figure 4:
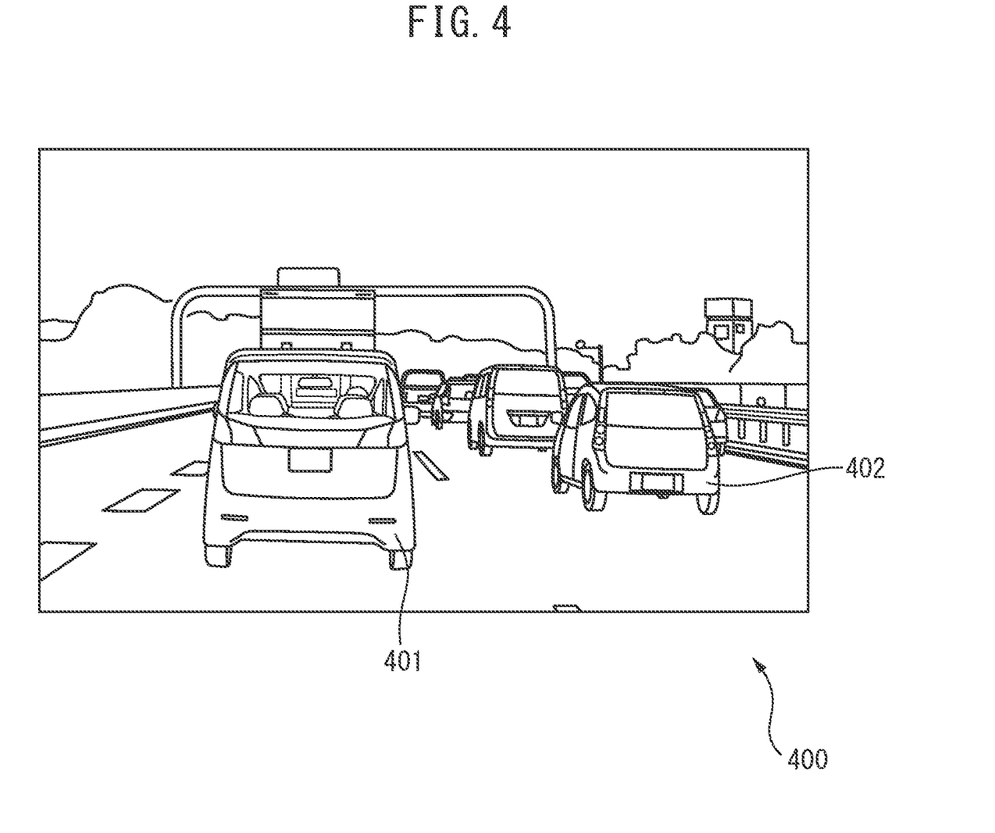
FIG. 4 is a schematic diagram for explaining an example of determination of a first control command.

FIG. 4 is a schematic diagram for explaining an example of determination of a first control command. When it is indicated that the light state of a vehicle 401 represented in an image 400 and traveling on a host vehicle lane ahead of the vehicle 10 is that its brake lights are on for a period P not shorter than the time threshold T1, a first control command for decelerating the vehicle 10 is outputted. Similarly, when it is indicated that the light state of a target vehicle 402 traveling on the immediate right lane of the host vehicle lane is that its left turn signal is blinking for a period P not shorter than the time threshold T1, a first control command for decelerating the vehicle 10 is outputted. In contrast, when the light state of the target vehicle traveling on the host vehicle lane is not that its brake lights are on and the light state of the target vehicle traveling on the adjoining lane is not that its turn signal on the host vehicle lane is blinking, a first control command for instructing the vehicle 10 to maintain the current speed is outputted.

The predetermined rule is not limited to the above-described examples. For example, the predetermined rule may include a rule to accelerate the vehicle 10. For example, assume that a rear camera to capture a region behind the vehicle 10 is provided on the vehicle 10 separately from the camera 2. Additionally, assume that a target vehicle detected from time-series images generated by the rear camera is traveling on a lane adjoining the host vehicle lane behind the vehicle 10, and that the light state of the target vehicle is that its turn signal on the host vehicle lane is blinking. In this case, it is supposed that the target vehicle will make a lane change to the host vehicle lane behind the vehicle 10. Thus the first command determination unit 34 may set the first control value included in the first control command at a value to accelerate the vehicle 10 so that the distance between the vehicle 10 and the target vehicle will increase.

Additionally, the predetermined rule may include a rule in which output from an intermediate layer of the light-state classifier (e.g., a feature map) is used. For example, assume that the sum of squares of individual values included in the latest feature map outputted from an intermediate layer of the light-state classifier for a target vehicle traveling on the host vehicle lane ahead of the vehicle 10 is smaller than a predetermined threshold. In this case, it is supposed that contrast in the object region is low, and that the result of identification of the light state by the light-state classifier is not reliable. Thus the first command determination unit 34 may determine the first control value regardless of the light state. For example, when the sum of squares of individual values included in a feature map for a target vehicle traveling on the host vehicle lane is smaller than the predetermined threshold, the first command determination unit 34 may generate a first control command including greater deceleration as the distance between the target vehicle and the vehicle 10 decreases.

As described above, when one or more target vehicles satisfy one of the rules, the first command determination unit 34 outputs a first control command including a first control value for instructing the vehicle 10 to make a motion corresponding to the satisfied rule. Additionally, when the distance between a target vehicle traveling on the host vehicle lane and the vehicle 10 falls below a predetermined distance, the first command determination unit 34 may output a first control command for decelerating the vehicle 10, regardless of the light state of the target vehicle. The predetermined distance is set longer as the speed of the vehicle 10 increases.

The second command determination unit 35 inputs the result of identification of the light state of each target vehicle into a classifier for determining a control command for determining a second control command including a second control value. The classifier for determining a control command will hereafter be referred to as a control command classifier. The control command classifier is trained in advance to output a control value for controlling the vehicle 10 to avoid a collision between the vehicle 10 and the target vehicle. In the present embodiment, the second control value is target acceleration/deceleration of the vehicle 10 to avoid a collision between the vehicle 10 and the target vehicle, as is the first control value. As input parameters of the control command classifier may be used the result of identification of the light state and at least one of the following: the positional relationship between the vehicle 10 and the target vehicle, a relative speed between the vehicle 10 and the target vehicle, relative acceleration/deceleration between the vehicle 10 and the target vehicle, the size of the object region including the target vehicle, and the position of the object region in the image. Output from any one of the at least one intermediate layer of the light-state classifier (e.g., a feature map) may also be used as an input parameter of the control command classifier. Additionally, regarding one or more of these input parameters, the second command determination unit 35 may input not only the latest values but also values obtained in a preceding predetermined period into the control command classifier. Input of such parameters together with the result of identification of the light state enables the control command classifier to output an appropriate second control value even in a travel situation in which it is difficult to identify the light state of the target vehicle.

As the control command classifier, the second command determination unit 35 can use a neural network having a recursive structure, such as RNN, LSTM or GRU. Alternatively, the second command determination unit 35 may use a neural network having a structure different from a recursive structure as the control command classifier. For example, as the control command classifier, the second command determination unit 35 can use a neural network including an input layer, one or more intermediate layers that are fully-connected layers, and an output layer of some control output that uses a sigmoid function or a softmax function as the activation function. Alternatively, the second command determination unit 35 may use a classifier conforming to a machine learning model other than a neural network as the control command classifier. As such a classifier, the second command determination unit 35 can use, for example, a SVM, a logistic regression model, or a naive Bayes classifier.

The control command classifier is trained in advance in accordance with a training technique depending on the classifier with a large amount of training data including combinations of input parameters and appropriate control output for collision avoidance corresponding to these input parameters. The appropriate control output for collision avoidance also includes control output to maintain the speed and direction of the vehicle 10 to avoid unnecessary deceleration and turning when there is no risk of collision. Thus the use of such a control command classifier enables the second command determination unit 35 to determine an appropriate control command depending on the light state of a target vehicle.

In the case that the light-state classifier and the control command classifier are configured as neural networks, they may be integrally trained with common training data by backpropagation. Such integral training enables the classifiers to determine an appropriate control command even if it is difficult to identify the light state of a target vehicle in the situation around the vehicle 10. In the case that the classifier for object detection is also configured as a neural network, it may also be integrally trained together with the light-state classifier and the control command classifier.

The second command determination unit 35 outputs the determined second control command to the command integration unit 36.

The command integration unit 36 determines an integrated control command including an integrated control value for avoiding a collision between the vehicle 10 and a target vehicle, based on the difference between the first control value included in the first control command and the second control value included in the second control command or the absolute value of the second control value.

For example, when the absolute value of the difference between the acceleration/deceleration specified by the first control command and that specified by the second control command (hereafter, the "difference in acceleration/deceleration") is not greater than a certain value, these control commands will be highly reliable. Thus, in the case that the difference in acceleration/deceleration between the first and second control commands has not been greater than a certain value over a period P not shorter than a predetermined time threshold T2, the command integration unit 36 determines the average of the acceleration/deceleration values included in the latest first and second control commands as the integrated control value. Alternatively, the command integration unit 36 may determine the average of the acceleration/deceleration values included in the first control commands and the second control commands received in the period P as the integrated control value. This prevents a rapid change in the acceleration/deceleration of the vehicle 10.

In the case that the difference in acceleration/deceleration between the first and second control commands has been not been less than the certain value over a period P not shorter than a third time threshold T3, these control commands will be relatively unreliable. Thus the command integration unit 36 determines the greater of the absolute value of the average of the acceleration/deceleration values in the first control commands received in the period P and the absolute value of the average of the acceleration/deceleration values in the second control commands received in the period P as the integrated control value included in the integrated control command. In this way, the command integration unit 36 can generate an integrated control command for deceleration control according to the output from the second command determination unit 35 even if, for example, it is determined by the first command determination unit 34 that deceleration control is unnecessary but it is actually necessary. The third time threshold T3 is preferably set, for example, longer than the second time threshold T2.

In the case that the difference in acceleration/deceleration between the first and second control commands has been greater than the certain value for a period P less than the second time threshold T2, it is supposed that the first control commands or the second control commands or both are not constantly reliable. Thus the command integration unit 36 may include the acceleration/deceleration obtained by applying feedback control to the acceleration/deceleration included in the second control command, in the integrated control command, as the integrated control value. As the feedback control, for example, PD control or PID control is used. This prevents a rapid change in the acceleration/deceleration of the vehicle 10, enabling the command integration unit 36 to smoothly accelerate or decelerate the vehicle 10.

In the case that the variance of the acceleration/deceleration values in the first control commands or the second control commands in a certain period is greater than a certain value, it is supposed that the first control commands or the second control commands or both are not constantly reliable. Thus the command integration unit 36 ignores the control commands supposed to be not constantly reliable, for a predetermined period, and uses the acceleration/deceleration values in the other control commands as integrated control values during this period, enabling smoothly accelerating or decelerating the vehicle 10.

Alternatively, when the absolute value of the acceleration/deceleration included in the second control command is not less than a predetermined upper limit threshold, the command integration unit 36 may use the acceleration/deceleration corresponding to the upper limit threshold as the integrated control value included in the integrated control command. Alternatively, when the absolute value of the acceleration/deceleration included in the second control command is not less than a predetermined upper limit threshold, the control command classifier may have outputted an abnormal value because the situation around the vehicle 10 is beyond expectation. Thus, in this case, the command integration unit 36 uses the acceleration/deceleration included in the first control command as the integrated control value. Alternatively, the command integration unit 36 may use the integrated control value included in the previously outputted integrated control command as the current integrated control value so as to continue the same control.

The command integration unit 36 notifies the integrated control command to the vehicle control unit 37.

The vehicle control unit 37 controls components of the vehicle 10 so that it will travel according to the integrated control value included in the integrated control command received from the command integration unit 36. For example, the vehicle control unit 37 sets the degree of accelerator opening or the amount of braking so as to minimize the difference between the current acceleration of the vehicle 10 measured by an acceleration sensor (not illustrated) and the acceleration/deceleration of the integrated control value included in the received integrated control command. To this end, the vehicle control unit 37 may set the degree of accelerator opening or the amount of braking by feedback control, such as PD control or PID control. The vehicle control unit 37 then determines the amount of fuel injection according to the set degree of accelerator opening, and outputs a control signal depending on the amount of fuel injection to a fuel injector of an engine of the vehicle 10. Alternatively, the vehicle control unit 37 determines the electric power to be supplied to a motor of the vehicle 10 according to the set degree of accelerator opening, and controls a driver of the motor so that the determined electric power will be supplied to the motor. Alternatively, the vehicle control unit 37 outputs a control signal depending on the set amount of braking to the brake of the vehicle 10.

Figure 5:
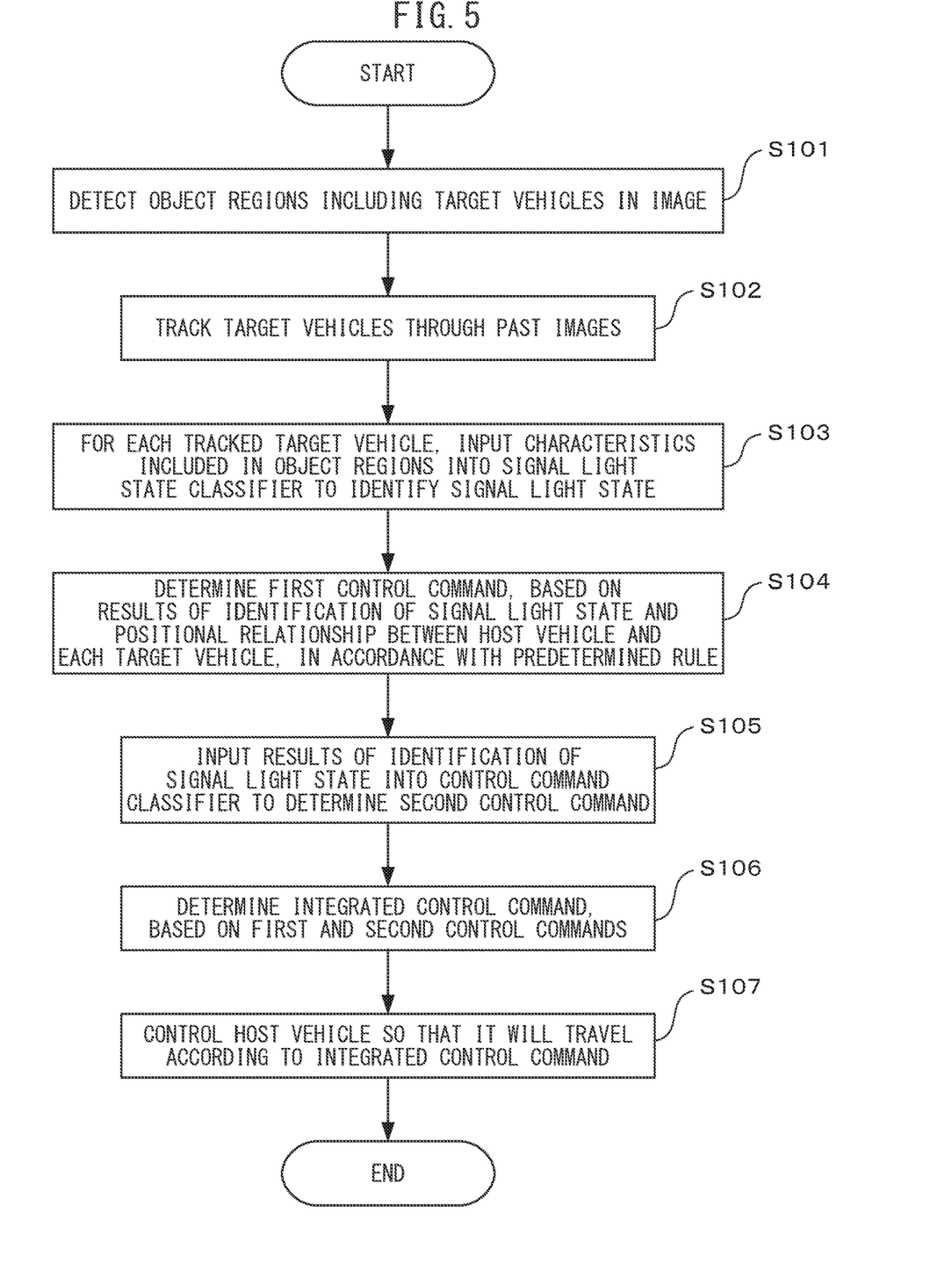
FIG. 5 is an operation flowchart of the vehicle control process.

FIG. 5 is an operation flowchart of the vehicle control process executed by the processor 23. The processor 23 executes the vehicle control process at predetermined intervals in accordance with the operation flowchart illustrated in FIG. 5.

The object detection unit 31 of the processor 23 inputs the latest image obtained from the camera 2 into the classifier for object detection to detect target vehicles represented in the image. In other words, the object detection unit 31 detects object regions respectively including target vehicles in the image (step S101). The object detection unit 31 then enters the detected target vehicles in the detected-object list.

For each object region including a target vehicle in the latest image, the tracking unit 32 of the processor 23 tracks the target vehicle represented in the object region, based on the object region and object regions in past images (step S102).

For each tracked target vehicle, the state identification unit 33 of the processor 23 inputs characteristics obtained from pixel values of the object regions representing the target vehicle into the light-state classifier to identify the light state of the target vehicle (step S103).

Additionally, the first command determination unit 34 of the processor 23 determines a first control command, based on the light states of the tracked target vehicles and the positional relationship between each target vehicle and the vehicle 10, in accordance with the predetermined rule (step S104).

The second command determination unit 35 of the processor 23 inputs the results of identification of the light states of the tracked target vehicles into the control command classifier to determine a second control command (step S105).

The command integration unit 36 of the processor 23 determines an integrated control command, based on the first and second control commands (step S106). The vehicle control unit 37 of the processor 23 controls the vehicle 10 so that it will travel according to the integrated control command (step S107). The processor 23 then terminates the vehicle control process.

As has been described above, the vehicle controller detects a target vehicle from time-series images generated by the camera mounted on the host vehicle, and tracks the target vehicle. The vehicle controller then inputs characteristics obtained from the object regions representing the target vehicle in the respective images into the light-state classifier to identify the light state of the target vehicle. Additionally, the vehicle controller determines a first control command related to travel of the host vehicle, based on the result of identification of the light state of the target vehicle and the positional relationship between the host vehicle and the target vehicle, in accordance with the predetermined rule. Additionally, the vehicle controller inputs the result of identification of the light state of the target vehicle into the control command classifier to determine a second control command related to travel of the host vehicle. The vehicle controller then determines an integrated control command, based on the first and second control commands, and controls travel of the host vehicle according to the determined control command. In this way, the vehicle controller refers to the positional relationship between the host vehicle and the target vehicle as well as the result of identification of the light state of the target vehicle, and thus can determine the first control command relatively appropriately even if it is difficult to correctly identify the light state. The vehicle controller uses the control command classifier, which is based on a machine learning system and receives the result of identification of the light state as one of its input parameters. The training data used for training the control command classifier also includes data representing combinations of the results of identification of the light state in travel situations in which the accuracy of identification is insufficient and vehicle control to be executed. For this reason, the control command classifier can determine the second control command relatively appropriately even if it is difficult to correctly identify the light state. Additionally, the vehicle controller can determine a control command that will be appropriate for avoiding a collision between the host vehicle and the target vehicle by referring to both the first and second control commands. For this reason, the vehicle controller can appropriately control the host vehicle even if it is difficult to identify the light states of vehicles around the host vehicle. For example, the vehicle controller can prevent deceleration control when no target vehicle has cut in ahead of the host vehicle, and prevent failure to brake caused by oversight of a blinking direction indicator of a cutting-in target vehicle or lighted brake lights of a decelerating target vehicle.

A computer program for achieving the functions of the processor 23 of the vehicle controller according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. A vehicle controller comprising:
a processor configured to:
detect an object region from an image obtained by a camera mounted on a vehicle, the camera being configured to capture surroundings of the vehicle, the object region representing a target vehicle traveling in an area around the vehicle;
input characteristics extracted from the object region in the image into a light-state classifier to identify a light state that is the state of a signal light of the target vehicle, the light-state classifier having been trained to identify the light state of the target vehicle;
determine a first control value, based on the result of identification of the light state of the target vehicle and the positional relationship between the vehicle and the target vehicle, in accordance with a predetermined rule for controlling the vehicle to avoid a collision between the vehicle and the target vehicle;
input the result of identification of the light state of the target vehicle into a control command classifier to determine a second control value for controlling the vehicle to avoid a collision between the vehicle and the target vehicle, the control command classifier having been trained to output the second control value;
determine an integrated control value for avoiding a collision between the vehicle and the target vehicle, based on the difference between the first and second control values or the absolute value of the second control value; and control travel of the vehicle according to the integrated control value.

2. The vehicle controller according to claim 1, wherein the processor outputs the first and second control values, respectively, every predetermined time interval, and in the case that the absolute value of the difference between the first and second control values has not been greater than a certain value over a period not shorter than a predetermined time threshold, the processor determines an average of any one of first control values and any one of second control values outputted in the period as the integrated control value.

3. The vehicle controller according to claim 1, wherein the processor outputs the first and second control values, respectively, every predetermined time interval, and in the case that the absolute value of the difference between the first and second control values has not been less than a certain value over a period not shorter than a predetermined time threshold, the processor determines the greater of the absolute value of an average of first control values outputted in the period and the absolute value of an average of second control values outputted in the period as the integrated control value.

4. The vehicle controller according to claim 1, wherein when the absolute value of the second control value is not less than a predetermined upper limit, the processor determines the predetermined upper limit or the first control value as the integrated control value.

5. The vehicle controller according to claim 1, wherein the processor determines the second control value by inputting, into the control command classifier, the result of identification of the light state of the target vehicle and at least one of the following: the positional relationship between the vehicle and the target vehicle, a relative speed between the vehicle and the target vehicle, relative acceleration/deceleration between the vehicle and the target vehicle, the size of the object region, and the position of the object region.

6. The vehicle controller according to claim 1, wherein the light-state classifier includes an input layer into which characteristics extracted from the object region are inputted, an output layer that outputs the light state of the target vehicle, and at least one intermediate layer between the input layer and the output layer, the at least one intermediate layer being provided sequentially from the input layer toward the output layer and each executing a predetermined operation on output from a layer closer to the input layer than the intermediate layer, and the processor determines the second control value by inputting the result of identification of the light state of the target vehicle and the result of the predetermined operation by any one of the at least one intermediate layer of the light-state classifier into the control command classifier.

7. The vehicle controller according to claim 1, wherein the light-state classifier has a recursive structure, and the processor identifies the light state of the target vehicle by inputting the characteristics extracted from the object region in the image and characteristics extracted from the object region in each of one or more past images obtained by the camera earlier than the image into the light-state classifier in chronological order.

8. The vehicle controller according to claim 1, wherein the light-state classifier is a convolutional neural network including a convolution layer that executes a convolution operation in a temporal direction, and the processor identifies the light state of the target vehicle by inputting the characteristics extracted from the object region in the image and characteristics extracted from the object region in each of one or more past images obtained by the camera earlier than the image into the light-state classifier.

9. A method for controlling a vehicle, comprising:

detecting an object region representing a target vehicle traveling in an area around the vehicle from an image obtained by a camera mounted on the vehicle, the camera being configured to capture surroundings of the vehicle;

inputting characteristics extracted from the object region in the image into a light-state classifier to identify a light state that is the state of a signal light of the target vehicle, the light-state classifier having been trained to identify the light state of the target vehicle;

determining a first control value, based on the result of identification of the light state of the target vehicle and the positional relationship between the vehicle and the target vehicle, in accordance with a predetermined rule for controlling the vehicle to avoid a collision between the vehicle and the target vehicle;

inputting the result of identification of the light state of the target vehicle into a control command classifier to determine a second control value for controlling the vehicle to avoid a collision between the vehicle and the target vehicle, the control command classifier having been trained to output the second control value;

determining an integrated control value for avoiding a collision between the vehicle and the target vehicle, based on the difference between the first and second control values or the absolute value of the second control value; and controlling travel of the vehicle according to the integrated control value.

10. A non-transitory recording medium that stores a computer program for controlling a vehicle, the computer program causing a processor mounted on the vehicle to execute a process comprising:

detecting an object region representing a target vehicle traveling in an area around the vehicle from an image obtained by a camera mounted on the vehicle, the camera being configured to capture surroundings of the vehicle;

inputting characteristics extracted from the object region in the image into a light-state classifier to identify a light state that is the state of a signal light of the target vehicle, the light-state classifier having been trained to identify the light state of the target vehicle;

determining a first control value, based on the result of identification of the light state of the target vehicle and the positional relationship between the vehicle and the target vehicle, in accordance with a predetermined rule for controlling the vehicle to avoid a collision between the vehicle and the target vehicle;

inputting the result of identification of the light state of the target vehicle into a control command classifier to determine a second control value for controlling the vehicle to avoid a collision between the vehicle and the target vehicle, the control command classifier having been trained to output the second control value;

determining an integrated control value for avoiding a collision between the vehicle and the target vehicle, based on the difference between the first and second control values or the absolute value of the second control value; and controlling travel of the vehicle according to the integrated control value.

* * * * *